US010191890B2

(12) United States Patent
Borza et al.

(10) Patent No.: US 10,191,890 B2
(45) Date of Patent: Jan. 29, 2019

(54) PERSISTENT VIEWPORTS

(71) Applicant: Microsoft Technology Licensing, LLC, Redmond, WA (US)

(72) Inventors: Paul Valentin Borza, Redmond, WA (US); Vaibhav Girish Parikh, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 252 days.

(21) Appl. No.: 14/573,784

(22) Filed: Dec. 17, 2014

(65) Prior Publication Data

US 2016/0179754 A1    Jun. 23, 2016

(51) Int. Cl.
| | |
|---|---|
| *G06F 3/0482* | (2013.01) |
| *G06F 3/0485* | (2013.01) |
| *G06F 17/21* | (2006.01) |
| *H04L 29/06* | (2006.01) |
| *G06F 17/30* | (2006.01) |
| *G06F 3/0481* | (2013.01) |
| *G06Q 10/10* | (2012.01) |
| *G09G 5/14* | (2006.01) |
| *G09G 5/34* | (2006.01) |

(52) U.S. Cl.
CPC .......... *G06F 17/212* (2013.01); *G06F 3/0481* (2013.01); *G06F 3/0482* (2013.01); *G06F 3/0485* (2013.01); *G06F 17/30905* (2013.01); *G06Q 10/101* (2013.01); *G06Q 10/103* (2013.01); *H04L 65/403* (2013.01); *G09G 5/14* (2013.01); *G09G 5/34* (2013.01)

(58) Field of Classification Search
CPC ............................ G06F 3/0481; G06F 3/0482
USPC .......................................................... 715/764
See application file for complete search history.

(56) References Cited

U.S. PATENT DOCUMENTS

| | | | |
|---|---|---|---|
| 5,867,156 A | 2/1999 | Beard et al. | |
| 6,182,115 B1 * | 1/2001 | Cuomo | ..................... G06F 9/52 709/204 |
| 8,010,901 B1 | 8/2011 | Rogers | |
| 8,108,779 B1 * | 1/2012 | Rein | ................. G06F 17/30017 715/733 |

(Continued)

OTHER PUBLICATIONS

"International Search Report and Written Opinion Issued in PCT Application No. PCT/US2015/065923", dated Mar. 24, 2016, 14 Pages.

(Continued)

*Primary Examiner* — Reza Nabi
*Assistant Examiner* — Daniel Rodriguez

(57) ABSTRACT

A persistent viewports architecture that provides a persistent and correctly-positioned viewport to a user when a collaboration document is being updated. The architecture identifies and utilizes a user's element-of-interest in content of the document to determine and recalculate the correct position of the user viewport. The architecture tracks a topmost element of the content (or section of content) from the viewport and employs the topmost element as a reference element. The topmost element can be one or more of a paragraph, a header, string of text, and an image. When the underlying document is to be updated, the viewport performs a lookup of reference element, and after finding the reference element, adjusts the X and Y offsets of the viewport so that the element-of-interest is inside the viewport.

20 Claims, 7 Drawing Sheets

(56) References Cited

U.S. PATENT DOCUMENTS

| | | | |
|---|---|---|---|
| 8,555,193 | B2 | 10/2013 | Sar et al. |
| 8,572,478 | B2 | 10/2013 | Lloyd et al. |
| 8,689,095 | B2 | 4/2014 | Parish et al. |
| 8,832,569 | B2* | 9/2014 | Chen ............... G06Q 10/10 715/758 |
| 9,166,939 | B2* | 10/2015 | Rasmussen .... H04N 21/440263 |
| 2003/0179230 | A1* | 9/2003 | Seidman ............ G06F 3/1454 715/750 |
| 2006/0166689 | A1* | 7/2006 | Phillips .......... G06F 17/30578 455/502 |
| 2007/0186171 | A1* | 8/2007 | Junuzovic ........... G06F 3/0481 715/751 |
| 2007/0299795 | A1* | 12/2007 | Macbeth ............. G06Q 10/10 706/16 |
| 2008/0168388 | A1 | 7/2008 | Decker |
| 2009/0327952 | A1* | 12/2009 | Karas ................ G06F 3/0485 715/786 |
| 2010/0257457 | A1* | 10/2010 | De Goes ............ G06Q 10/10 715/751 |
| 2011/0010640 | A1* | 1/2011 | Fox .................. G06Q 10/10 715/753 |
| 2011/0047504 | A1 | 2/2011 | Wienands et al. |
| 2011/0252339 | A1* | 10/2011 | Lemonik .......... G06F 17/2288 715/753 |
| 2013/0100018 | A1 | 4/2013 | Honji |
| 2013/0185164 | A1 | 7/2013 | Pottjegort |
| 2013/0290863 | A1* | 10/2013 | Chen ................. G06F 3/0481 715/747 |
| 2014/0013236 | A1* | 1/2014 | Horsman ............. G06F 9/451 715/744 |
| 2014/0055400 | A1* | 2/2014 | Reuschel ............. G06F 9/452 345/173 |
| 2014/0136960 | A1 | 5/2014 | Borza et al. |
| 2014/0215352 | A1* | 7/2014 | Blecon .............. H04L 12/1827 715/752 |
| 2014/0244165 | A1* | 8/2014 | Bells .................. G01C 21/367 701/455 |
| 2014/0282074 | A1 | 9/2014 | Laukkanen et al. |
| 2014/0372855 | A1* | 12/2014 | Myerscough ........ G06F 17/246 715/220 |
| 2015/0120834 | A1 | 4/2015 | Maheshwari et al. |
| 2015/0169208 | A1* | 6/2015 | Cho .................. H04L 12/1827 715/752 |
| 2015/0281647 | A1* | 10/2015 | Xin ..................... H04N 7/152 348/14.09 |
| 2015/0341399 | A1* | 11/2015 | Lee ................... H04L 65/403 715/255 |
| 2015/0341401 | A1* | 11/2015 | Lee ................... H04L 65/403 715/753 |
| 2015/0350273 | A1* | 12/2015 | French ............. H04L 12/1822 709/205 |
| 2015/0363094 | A1* | 12/2015 | Stone ................ G06F 3/04842 715/753 |
| 2016/0019273 | A1* | 1/2016 | Bowman .......... G06F 17/30569 707/811 |
| 2016/0062584 | A1* | 3/2016 | Cohen ................ G06F 3/0485 715/784 |
| 2016/0085381 | A1* | 3/2016 | Parker ................ G06F 3/1454 715/753 |
| 2016/0092420 | A1* | 3/2016 | Cesena .............. G06F 3/04812 715/759 |
| 2016/0154538 | A1* | 6/2016 | Wang ................. G09B 29/007 715/771 |

OTHER PUBLICATIONS

Bendel, et al., "WatchMyPhone—Providing Developer Support for Shared User Interface Objects in Collaborative Mobile Applications", In Proceedings of IEEE International Conference on Pervasive Computing and Communications Workshops, Mar. 19, 2012, 6 pages.

Lindley, Cody, "Determining Whether an Element Is Within the Viewport", Retrieved on: May 27, 2014, 6 pages, Available at: https://www.inkling.com/read/jquery-cookbook-cody-lindley-1st/chapter-6/recipe-6-5.

Mun, Terry, "Presenting: Fluidbox Recreating and Improving Medium's Default Lightbox Module", Published on: Jan. 4, 2014, 22 pages, Available at: https://medium.com/coding-design/9c7fe9db92c7.

"Second Written Opinion Issued in PCT Application No. PCT/US2015/065923", dated Dec. 1, 2016, 8 Pages.

"International Preliminary Report on Patentability Issued in PCT Application No. PCT/US2015/065923", dated Apr. 12, 2017, 9 Pages.

* cited by examiner

PERSISTENT VIEWPORTS

BACKGROUND

When a document size exceeds (e.g., in length) what the physical screen of a device can display, user interaction control elements such as scroll bars can be introduced to create a viewport through which the document is viewed and perused. As the user moves the position of the scroll thumb control element of the scroll bar, while it appears to the user that the document is being moved through the viewport, the user is essentially moving the viewport over the document. This is one way an operating system or application facilitates the navigation of a document that is larger than the device display can accommodate. While this technique works in the single-user environment, it is problematic in the environment of multi-user collaboration tools where multiple users can edit the same document through corresponding user viewports.

SUMMARY

The following presents a simplified summary in order to provide a basic understanding of some novel implementations described herein. This summary is not an extensive overview, and it is not intended to identify key/critical elements or to delineate the scope thereof. Its sole purpose is to present some concepts in a simplified form as a prelude to the more detailed description that is presented later.

The disclosed persistent viewports architecture provides a persistent and correctly-positioned passive user viewport for the passive user (and active user, as well) when a virtual document is being updated. The architecture can be applied to collaboration sessions as well. The architecture identifies and utilizes a user's element-of-interest in content of the document to determine and recalculate the correct position of the passive user viewport. Additionally, the architecture tracks a topmost element of the content (or section of content) from the passive user viewport and employs the topmost element as a reference element. The topmost element can be one or more of a paragraph, a header, string of text, and an image, for example.

When the underlying virtual document is to be updated, the passive user viewport performs a lookup of a reference element, and after finding the reference element, adjusts the X and Y coordinate offsets of the passive viewport so that the element-of-interest is inside the viewport.

The persistent viewports architecture can be implemented as a system, comprising: an element component configured to identify an element-of-interest in content of a virtual document, the element-of-interest in a passive user viewport of the virtual document presented to a passive user (e.g., of a collaboration session); an update component configured to receive and process an update of the virtual document from an active user (e.g., of the collaboration session); and, a viewport component configured to move the passive user viewport to maintain the element-of-interest in the passive user viewport of the passive user regardless of any positional change of the content due to the update by the active user.

The persistent viewports architecture can be implemented as a method, comprising acts of: identifying an element-of-interest in content of a virtual document, the element-of-interest in a passive user viewport of the virtual document presented on a passive user system (e.g., of a collaboration session); receiving an update to the content of the virtual document from an active user system (e.g., of the collaboration session); and persisting the element-of-interest in the passive user viewport of the passive user system regardless of any positional change of the content due to the update by the active user system.

The persistent viewports architecture can be implemented as yet another system, comprising: means for identifying an element-of-interest in content of a virtual document, the element-of-interest in a passive user viewport of the virtual document presented on a passive user system of a collaboration session; means for computing position of the passive user viewport relative to the element-of-interest; means for identifying a reference element in the content of the passive user viewport of the passive user system; means for receiving an update to the content of the virtual document from an active user system of the collaboration session; and means for persisting the passive user viewport to include the element-of-interest in the passive user viewport of the passive user system regardless of any positional change of the content due to the update by the active user system.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
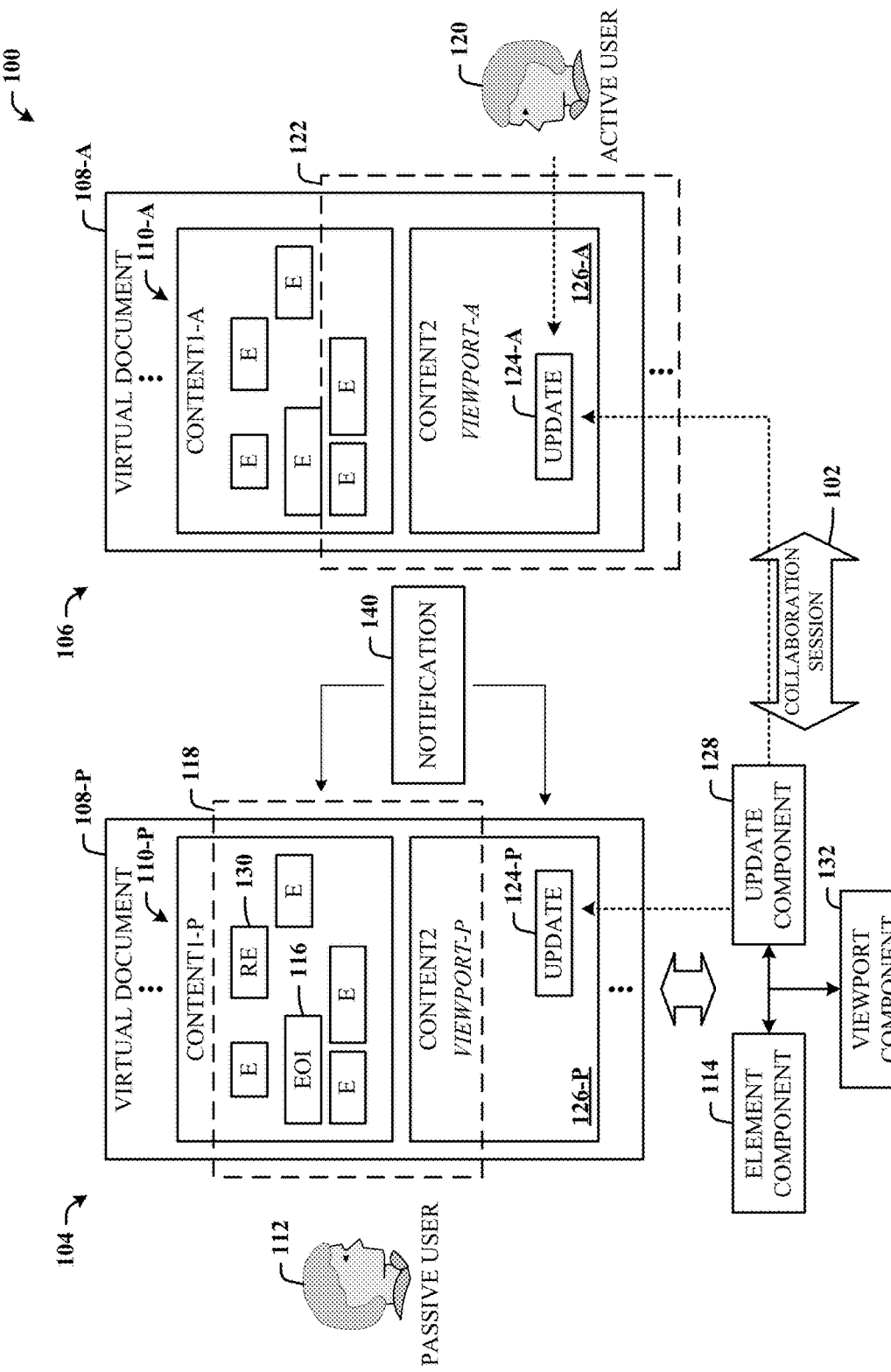
FIG. 1 illustrates a system in accordance with the disclosed architecture.

When a document is longer than the physical screen of a device can display, scroll bars can be made to appear in order to create what is known as a viewport. When the user moves the scroll positions, the user is essentially moving the viewport across the document. While this approach is commonly used, in collaboration applications, services, and/or tools, for example, it was almost never the case that multiple users can concurrently edit the same document or to be the case where the content of the document changes while the user was reading or editing it. Maintaining the position of the viewport while some other users are updating the content of the same document is challenging.

Some existing applications maintain a relative offset from the bottom of the document (the virtual document as presented) measured in pixels as the X and Y coordinates for the user viewport. The X and Y pixel offset becomes outdated once the document gets updated in any way. In these existing implementations, if the X and Y coordinates are relative to the bottom of the document, changing the length of the document (by an active (editing) user adding, appending, and/or deleting content) can impact a passive user's viewport experience. The process works the same way in existing systems if the X and Y coordinates are relative to the top of the document (in this case the change occurs in document sections that are before the current passive user's viewport). In other words, if the length of the document changes (e.g., via dynamic webpage updates or some other user editing the same page) this causes the viewport for the existing user to become incorrectly positioned—the document section the user was reading is no longer at the same X and Y coordinates, since some other user added an update (e.g., more text, more images, removal of content such as text, images, headers, etc.). This viewport disruption causes the user to be confused (distracted) as the content the user was just viewing appears to jump to a new position in the viewport or entirely out-of-view of the viewport, to another location in the document.

The disclosed architecture addresses this problem by persisting (maintaining) the viewport on (or over) the currently-being-viewed content even after the document was updated by another user. This capability enables concurrent collaboration over a network (e.g., the Internet). Rather than using X and Y pixel offsets relative to the top left corner or the bottom of the document to determine the viewport of the user, the persistent viewport architecture uses an element-of-interest in the content to quickly recalculate the position of the viewport over the currently-being-viewed content.

The persistent viewport architecture tracks the topmost element of the viewport as a reference element. This can be at least one of paragraph, a header, an image, string of text, or any other suitable content structure. When the document is updated, the viewport looks up the reference element in a memory, finds the reference element on the virtual document, and then adjusts the X and Y offsets of the viewport so that the element-of-interest or the reference element is still inside the viewport.

The architecture can be applied to any kind of document (e.g., HTML (hypertext markup language) page or any other document, e.g., under collaboration processing). Browsers and any suite office application that facilitates user collaboration can incorporate the disclosed architecture while the lookup for the element-of-interest can be by way of a hashset with elements that are stored in a memory (e.g., cache).

Reference is now made to the drawings, wherein like reference numerals are used to refer to like elements throughout. In the following description, for purposes of explanation, numerous specific details are set forth in order to provide a thorough understanding thereof. It may be evident, however, that the novel implementations can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates a system 100 in accordance with the disclosed architecture. The system 100 operates as part of a collaboration service that enables a collaboration session 102 of active and passive users. (While described in the context of document collaboration, it is to be understood that the system applies to non-collaboration implementations as well.) Accordingly, in this head-to-head example (one passive user and one active user), the system 100 includes a passive user system 104 in a passive mode and an active user system 106 in an active mode; however, it is to be appreciated that the collaboration session can include more than two users.

An active user is the user who is currently editing an "active" instance of the virtual document to effect changes or updates in the content, while the passive user is the user who is not editing the "passive" instance of the virtual document, but simply viewing the same or different instance of the content of the active virtual document during the editing process by the active user. The process works the same when the passive user becomes the active user, and the active user becomes a passive user. The functionality described in accordance with the passive user system applies equally to the active user system 106 such that the persistent viewport functionality operates concurrently for all users of the collaboration session working on the same virtual document. Thus, the active and passive modes can quickly toggle for the session users such that the active and passive modes switch according to who is currently editing the virtual document. In this implementation, only one user can be the active user at any given point in time, while there can be one or more passive users for every active user.

For this description, certain items in the passive user system 104 are suffixed with a "P" designator and certain items of the active user system 106 are suffixed with the "A" designator. For example, the instance of the virtual document in the passive user system 104 will include a "-P" suffix and the virtual document in the active user system 106 will include a "-A" suffix.

Continuing the description for the passive user system 104, the collaboration session 102 involves the editing of a virtual document 108. The instance of virtual document 108 on the passive user system 104 is designated virtual document 108-P, and the instance of virtual document 108 on the active user system 106 is designated virtual document 108-A. Similarly, the virtual document 108 comprises content 110, designated as content 110-P on the passive user system 104 and content 110-A on the active user system 106.

During the passive mode for a passive user 112 on the passive user system 104, an element component 114 is provided and configured to identify an element-of-interest (EOI) 116 in the content 110-P of the virtual document 108-P. The element-of-interest 116 is viewed in a passive user viewport 118 (also designated VIEWPORT-P), as part of the collaboration session 102.

The EOI 116 can be any one or more of the elements (E) in the content section CONTENT1-P of the content 110-P of the passive user viewport 118. The same elements exist in the same section CONTENT1-A of the content 110-A of the active user system 106; however, the active user system 106 does not need to identify an EOI in the section CONTENT1-A when in the active mode. However, in one alternative implementation, it can be the case the elements are also tracked when in active mode so as to prepare for passive mode status of the active user 120.

In accordance with the collaboration session 102, the content 110-A in the virtual document 108-A of the active user system 106 is viewable by the passive user 112 as content 110-P in the virtual document 108-P of the passive user system 104. The active user 120 can move the active user viewport 122 to peruse the content 110-A for places to make edits. It is the case that the passive user viewport 118 is not synchronized to the content location of the active user viewport 122 in the virtual document 108-A. Thus, the active user 120 can look at sections or areas of the content 110-A that the passive user 112 is not looking at, and vice versa.

Here, the active user 120 creates an update 124-A in a section 126-A of the content 110-A. Update generation can include operations such as content element movement, deletion, appending, and insertion of new elements, for example. This action generates an update signal from the active user system 106 to all passive user systems (e.g., passive user system 104).

The update 124-A by the active user 120 in the content section 126-A (e.g., a paragraph of text) can occur and be presented within the viewport 122 of the active user 120 as the edit is made. An update component 128 can be provided and configured to process the update signal and operate on the passive user system 104 to insert the update 124-A as update 124-P in the content 126-P of the virtual document 108-P.

It can be the case that the passive user 112 has moved the passive viewport 118 over sections or areas of the content 110-P that do not include portions of the content 126-P where the update 124-P is applied. Thus, the update 124-P as propagated to the virtual document 108-P, occurs outside the passive user viewport 118 via which the passive user 112 is viewing content 110-P. This change in the document length by update insertion can also be caused by deletions of portions (e.g., an image) of the content 110-A in the virtual document 108-A of the active user 120, or movement of a portion of the content 110-A to another area of the virtual document 108-A, for example.

However, the persistent viewport architecture operates to persist the position of the passive user viewport 118 on the portion of the content 110-P during and after the update 124-P is applied to the passive user virtual document 108-P so as to not disrupt the work (e.g., viewing, reviewing, etc.) being performed (e.g., reading, review, scrolling, etc.) by the passive user 112.

This viewport persistence is accomplished by the element component 114 identifying the element-of-interest 116 in the content section CONTENT1-P that the passive user 112 is viewing in the passive user viewport 118. The element-of-interest 116 can be any element in the content section CONTENT1-P. Identification of element-of-interest 116 further identifies the content section CONTENT1-P to ultimately be kept in view for the passive user. The element component 114 is further configured to identify a reference element (RE) 130 in the content of the passive user viewport 118 of the passive user. The reference element 130 includes at least one of a paragraph, a header, an image, or a string of text, for example.

In order to provide the passive user 112 with a positive viewing experience, the element component 114 is further configured to identify a topmost element of the content CONTENT1-P in the passive user viewport 118 of the passive user system 104 as the reference element 130. A viewport component 132 is provided and configured to move the passive user viewport 118 to maintain the element-of-interest 116 in the passive user viewport 118 of the passive user 112 regardless of any positional change of the content CONTENT1-P due to the update 124-A propagated by the active user system 106. The viewport component 132 is configured to compute the position of the passive user viewport 118 relative to the element-of-interest 116. The viewport component 132 is configured to move the passive user viewport 118 to include a predefined section (e.g., CONTENT21-P) of the content 110-P in which the element-of-interest 116 resides.

The element component 114 is configured to update and maintain a hashset and content elements in a memory based on changes in view of the virtual document 108-P in the passive user viewport 118 of the passive user 112.

The viewport component 132 is configured to move the viewport (passive user viewport 118) to include a predefined section of content (CONTENT1-P) in which the element-of-interest 116 resides. In one implementation, the viewport component 132 is configured to compute position of the viewport (passive user viewport 118) relative to the element-of-interest 116. In another implementation, the viewport component 132 is configured to compute the position of the viewport (passive user viewport 118) relative to the reference element 130. This position can include moving the top boundary of passive user viewport 118 above the reference element 130, where the reference element 130 is a string of text in the first sentence of a paragraph, the reference element 130 is an image which is then included in the passive user viewport 118, or the reference element 130 is header text such as a topic header in a multi-topic word processing document, for example.

Viewport persistence has the technical effect of improved user efficiency by maintaining user focus on work product in the passive user viewport 118 during update propagation from the active user system 106. The passive user 112 is then not required to re-navigate the virtual document 108-P to return to content previously being viewed.

Put another way, the system 100 comprises an element component 114 configured to identify the element-of-interest 116 in content 110-P of the virtual document 108-P. The element-of-interest 116 is currently presented in the virtual document 108-P to the passive user 112 via the passive user viewport 118 of the passive user system 104 of the collaboration session 102. The update component 128 is provided and configured to receive the update 124-A of the virtual document 108-A from the active user system 106 of the collaboration session 102. The viewport component 132 is provided and configured to move the passive user viewport 118 to maintain the element-of-interest 116 in the passive user viewport 118 of the passive user system 104 regardless of any positional change of the content 110-P (or change in length of the virtual document) due to the update 124-A by the active user system 106 being propagated to the passive user system 104.

The element component 114 is configured to identify the reference element 130 in the content CONTENT1-P of the passive user viewport 118 of the passive user system 104. The reference element 130 includes at least one of a paragraph, a header, an image, or a string of text. The element component 114 is configured to identify one of many possible topmost elements of the content CONTENT1-P in the passive user viewport 118 of the passive user system 104, as the reference element 130.

The element component 114 is configured to update and maintain a hashset and content elements (or element tags or identifiers of the content elements) in a memory based on changes in view of the virtual document 108-P in the viewport (passive user viewport 118) of the passive user system 104.

The viewport component 132 is configured to move the viewport (passive user viewport 118) to include a predefined section of content (CONTENT1-P) in which the element-of-interest 116 resides. The viewport component 132 is configured to compute position of the viewport (passive user viewport 118) relative to the element-of-interest 116.

It is to be understood that all computing systems of the collaboration session 102 can comprise the same persistent viewport components (e.g., the element component 114, the update component 128, and the viewport component 132).

These components then operate on the passive user systems to enable persistent viewports during updates propagated to those passive systems by an active system.

In one implementation, and as previously described, the active mode of user operation for collaboration processing can be initiated simply by one user editing the virtual document 108; and hence, this action automatically makes the other users passive users, who then are not allowed to edit at that same time the active user is editing.

However, in another implementation, it can be the case that the collaboration service can process concurrent updates from multiple "active" users of the session, but then queue the updates sequentially so as to eventually complete the updates to the virtual document 108. For example, groups of users (e.g., pairs) can be assigned to work on specific content sections of the virtual document 108. In this case, the architecture maintains the view in the respective viewports of each of the passive/active group users (e.g., pairs) as described herein. In this more "active" implementation, inputs and passive/active modes can be occurring at a high rate, and "asynchronously", rather than the synchronous implementation of a single active user and the remaining session users as passive users at any given point in time.

It can be the case that when the active user 120 makes the update 124-A that causes the passive user viewport 118 to be adjusted, the passive user 112 may receive and be presented with a notification 140 (e.g., prior to or in combination with the update 124-P) that the passive user viewport 118 was adjusted or will be adjusted. The notification 140 can also provide the option of jumping directly to the location of the update 124-P in the virtual document 108-P of the active user viewport 118 to see the update 124-P. For example, if the active user 120 is pasting a large block of text, when the passive user content 110-P is adjusted, the passive user 112 will also receive notification allowing the passive user 112 to jump (synchronize viewports) to the location of the active user's viewport to see the content the active user 120 has just pasted.

It also can be the case that the notification 140 also presents to the passive user 112 the option to opt-in to allow immediate insertion into the passive user's virtual document 108-P, or opt-out of the update 124-P to prevent immediate insertion into the passive user's virtual document 108-P. If choosing to opt-in (accept) the update 124-A from the active user 120 (active user system 106), the passive user 112 can then be automatically navigated to the update 124-P via the passive user viewport 118. If choosing to opt-out, this can then temporarily delay the insertion into the passive user virtual document 108-P. When delayed, the update 124-A from the active user system 106 can then be queued in the passive user system 104, for example, for ultimate entry into the passive user virtual document 108-P.

The notification 140 can be presented in the passive user viewport 118, outside the passive viewport 118, as simply a sound that indicates an update was received or is ready for insertion, or any other suitable form of media.

Figure 2:
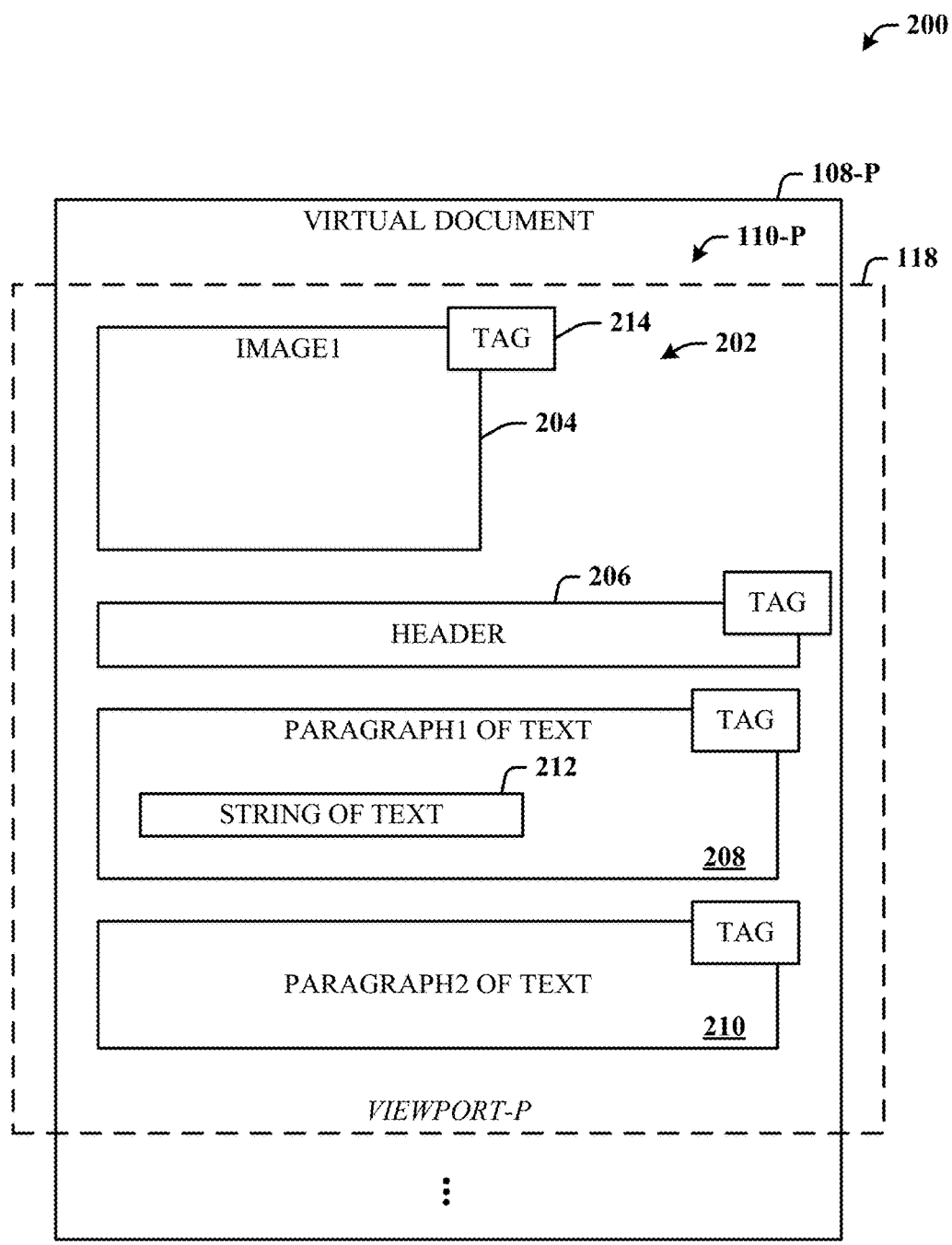
FIG. 2 illustrates a more detailed diagram of the elements of the content that can be considered for viewport persistence in accordance with the disclosed architecture.

FIG. 2 illustrates a more detailed diagram 200 of the elements 202 of the content 110-P that can be considered for viewport persistence in accordance with the disclosed architecture. Here, the virtual document 108-P comprises an image 204, a header 206, a first paragraph 208, and a second paragraph 210. Other content of content 110-P can be part of the virtual document 108-P, but is outside the passive user viewport 118. In one implementation, the element-of-interest can be identified as the largest piece of the content 110-P in the virtual document 108-P, where largest can be defined according to the number of pixels per area. Thus, in one case, the element-of-interest can be the image 204 or the first paragraph 208, for example. It can also be the case that the element-of-interest is also the reference element. Here, the image 204, being the largest in pixel area, may also be the reference element. Moreover, alternatively, since the image 204 is also the topmost element in the passive user viewport 118, the image 204 can be the reference element.

It can also be the case that the element-of-interest is a string of text 212 in the content 110-P. However, in this instance, the element-of-interest is not the topmost element, since the image 204 is the topmost element. But by identifying the image 204 at the topmost element, the string of text 212 can still be retained in the viewport 118.

The dimensions of the passive user viewport 118 can also impact whether specific areas or portions of the content 110-P are in the passive user viewport 118. The application that generates the passive user viewport 118 can, by default, define the size of the passive user viewport 118. Moreover, the specific device (e.g., a handheld device, desktop device, etc.) can also impact the size of the passive user viewport 118. For example, the viewport (active or passive) of a smartphone would typically be much smaller in dimension than the viewport (active or passive) of a desktop computer. In the smartphone instance, the viewport can actually extend to the full display dimensions, to improve on the ability of the passive user 112 to view the content, while the viewport of a desktop computer can be much smaller than the display of the desktop computer while still providing adequate viewing capability for the passive user 112.

In another implementation, rather than choosing the largest piece of content (e.g., the image 204) as the element-of-interest or the reference element, the user can proactively identify the element-of-interest and/or the reference element. The user can choose a specific piece of content (e.g., an image) to remain in the passive user viewport at any point in time regardless of any updates by other users. Thus, the element component 114 can be configured to present and enable the passive user to choose the element-of-interest and/or even the reference element. In this instance, there can be provided an active selectable tag object 214 for each identifiable and independent piece of content that the passive user can interact with to tag or mark that piece of content as the element of interest and/or the reference element. Thus, any updates input by other users will not affect the passive user viewport 118 in any way to disrupt the passive user view of that tagged content. It can be the case that the tagged content is automatically presented as the topmost element in the passive user viewport 118 (where passive user activity is below), a centered element (where the passive user activity is above or below) or even a bottom-most element (where the passive user activity is above the bottom-most element).

Another way of identifying the element-of-interest and/or the reference interest can be to apply commonly-known editing/annotating operations on the content, such as highlighting (or underlining, bolding, annotating, etc.) a string of text, a paragraph, or a section of text and paragraphs, for example. User input to enable such identifications can be by voice commands and/or input device controls, for example. If the user is (passively) interacting (e.g., based on viewer dwell time) extensively with a particular piece of content, this can be interpreted that the user chooses to keep that content in the passive user viewport.

Figure 3:
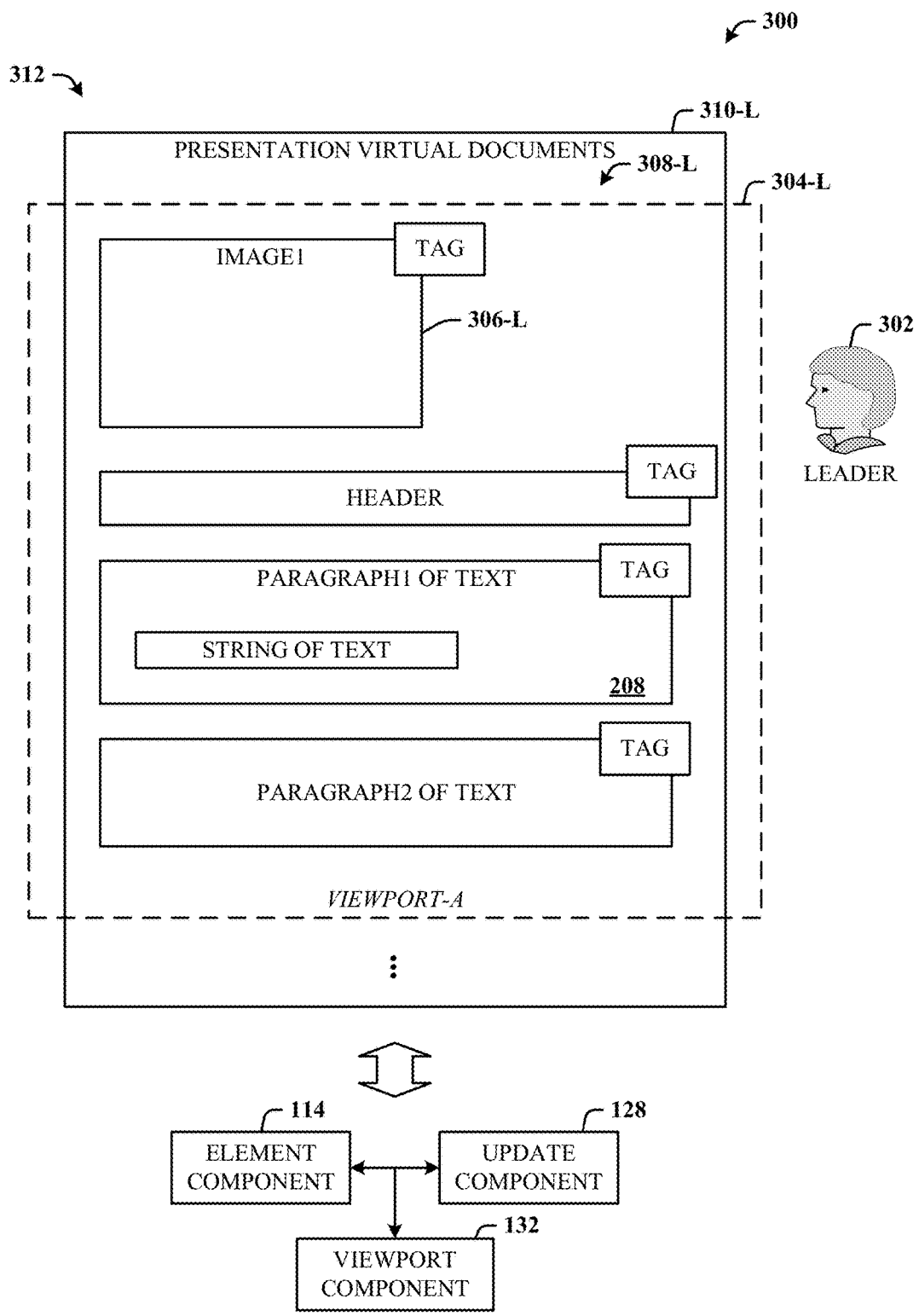
FIG. 3 illustrates an alternative implementation of a system of the disclosed persistent viewport architecture.

FIG. 3 illustrates an alternative implementation of a system 300 of the disclosed persistent viewport architecture. In this example implementation, rather than the architecture persisting the viewport of the passive user in response to updates made by the active user (e.g., in a collaboration session), the architecture operates in a leader-audience mode where the active user (leader) dictates the content that will be viewed by all passive users (the audience).

Here, a leader 302 directs the viewport (not shown) of the audience users (via a leader viewport 304-L ("L" for leader)) to a specific leader element 306-L of presentation content 308-L of presentation virtual documents 310-L of the leader computing system 312. Thus, in this case, the leader 302 (similar to the active user 120) is presenting the content 308-L to an audience of (passive) users. While the audience users can be given the flexibility to peruse the leader presentation virtual documents 310-L in an audience user viewport (not shown) during the presentation, the leader 302 can ensure that audience user(s) attention is focused on specific parts of the presentation content 308-L by directing the audience focus to content, which the leader 302 deems important at the time.

Thus, the leader 302 can tag or simply click on a piece of content (e.g., the first paragraph 208), which click and/or tag can then be interpreted by the element component 114 to redirect some or all audience viewports to the tagged content (e.g., the first paragraph 208).

Moreover, this capability enables the leader 302 to jump around the presentation virtual documents 310-L to immediately bring into presentation in the audience viewports the pages and/or pieces of content the leader 302 wants the audience users to see. Thus, such a presentation can be facilitated via user computing devices (e.g., smartphones, tablets, laptops, etc.), rather than a typical large screen employed in front of an audience.

The update component 128 then enables the leader 302 to further make updates to the presentation virtual documents 310-L. In response, the viewport component 132 of each audience user system moves the audience user viewport to the specified leader content location where the update is made. Alternatively, the viewport of each audience user system can be delayed temporarily (e.g., seconds) before redirecting the audience user viewport to the leader-specified content. This slight delay improves user understanding of the content currently be viewed by not disrupting user attention to the content currently being viewed.

It is to be understood that in the disclosed architecture, certain components may be rearranged, combined, omitted, and additional components may be included. Additionally, in some implementations, all or some of the components are present on the client, while in other implementations some components may reside on a server or are provided by a local or remote service. For example, in a client device, the element component 114, update component 128, and viewport component 132 can be implemented as a single service in each client device. In a cloud implementation, one or more of the components (114, 128, 132) can be implemented as cloud services to user devices that are incapable (software-wise and/or hardware-wise) of employing the component(s) locally.

In this alternative implementation, there can be provided a system, comprising: an element component configured to identify an element-of-interest specified by an active user (a leader) in content of a virtual documents associated with a presentation, the element-of-interest in a viewport of the active user; an update component configured to process an update or tag from the active user associated with to the virtual documents; and, a viewport component configured to facilitate movement of the viewports of passive users (e.g., audience users) to the content associated with the element-of-interest of the active user regardless of any positional change of the passive user viewport by the active user.

In this alternative implementation, there can be provided a method, comprising acts of: receiving a leader-specified identification of an element-of-interest in content of virtual documents of a presentation, the element-of-interest designated by a leader via a leader viewport; processing the leader-specified identification via the update component and updating audience user systems as to the update; and moving audience user viewports to include the element-of-interest regardless of any positional change initiated by the audience user viewports by the corresponding audience users.

The disclosed architecture can optionally include a privacy component (not shown) that enables the user to opt in or opt out of exposing personal information such as selecting or viewing specific content in a virtual document. The privacy component enables the authorized and secure handling of user information, such as tracking information, as well as personal information that may have been obtained, is maintained, and/or is accessible. The user can be provided with notice of the collection of portions of the personal information and the opportunity to opt-in or opt-out of the collection process. Consent can take several forms. Opt-in consent can impose on the user to take an affirmative action before the data is collected. Alternatively, opt-out consent can impose on the user to take an affirmative action to prevent the collection of data before that data is collected.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 4:
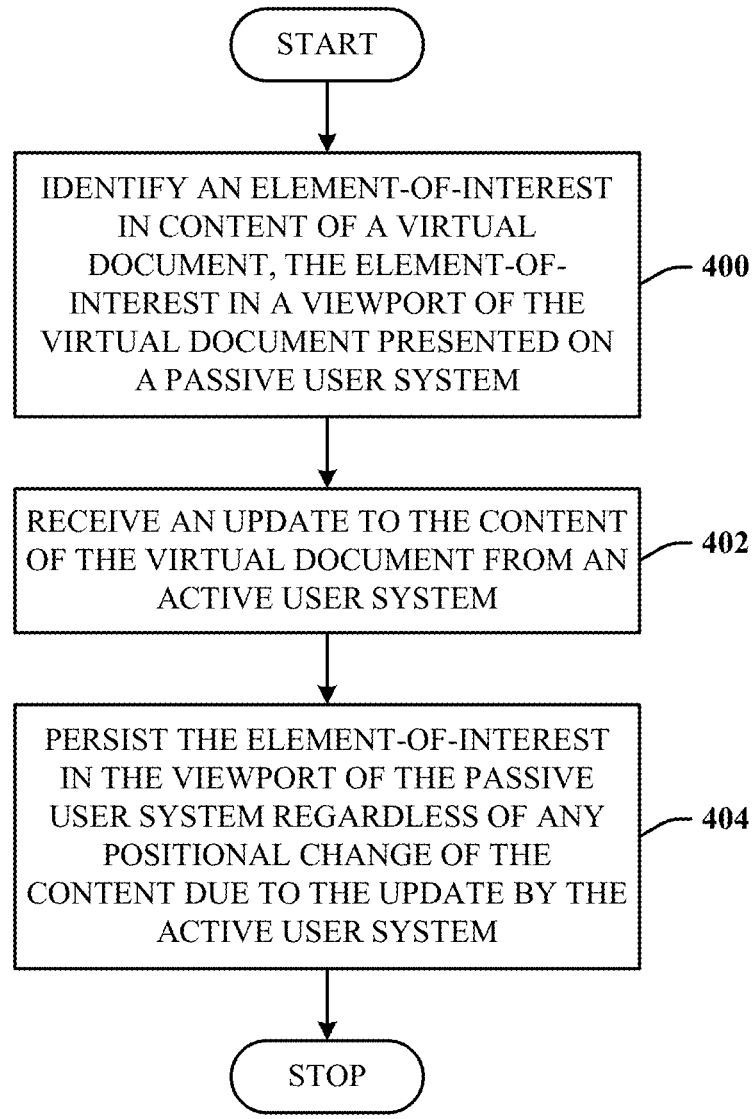
FIG. 4 illustrates a method in accordance with the disclosed architecture.

FIG. 4 illustrates a method in accordance with the disclosed architecture. At 400, an element-of-interest is identified in content of a virtual document. The element-of-interest is in a viewport of the virtual document presented on a passive user system. At 402, an update to the content of the virtual document is received from an active user system. At 404, the element-of-interest is persisted in the viewport of the passive user system regardless of any positional change of the content due to the update by the active user system.

The method can further comprise computing position of the viewport relative to the element-of-interest. The method can further comprise identifying a reference element in the content of the viewport of the passive user system in response to the update. The method can further comprise identifying a topmost element in the viewport of the passive user system as the reference element.

The method can further comprise identifying the reference element in response to the update and adjusting an offset in the content to persist the element-of-interest in the viewport. The method can further comprise searching for the element-of-interest in a memory that stores a hashset and elements of the content. The method can further comprise synchronizing the update across applications of passive user systems while maintaining position of the element-of-interest in corresponding viewports of the passive user systems.

The method can further comprise shifting position of the viewport to include the element-of-interest in the viewport.

The method can further comprise receiving the update in a part of the virtual document that outside the viewport of the passive user system. The method applies as well to a collaboration session of passive users, and an active user making updates to documents under collaboration editing.

Figure 5:
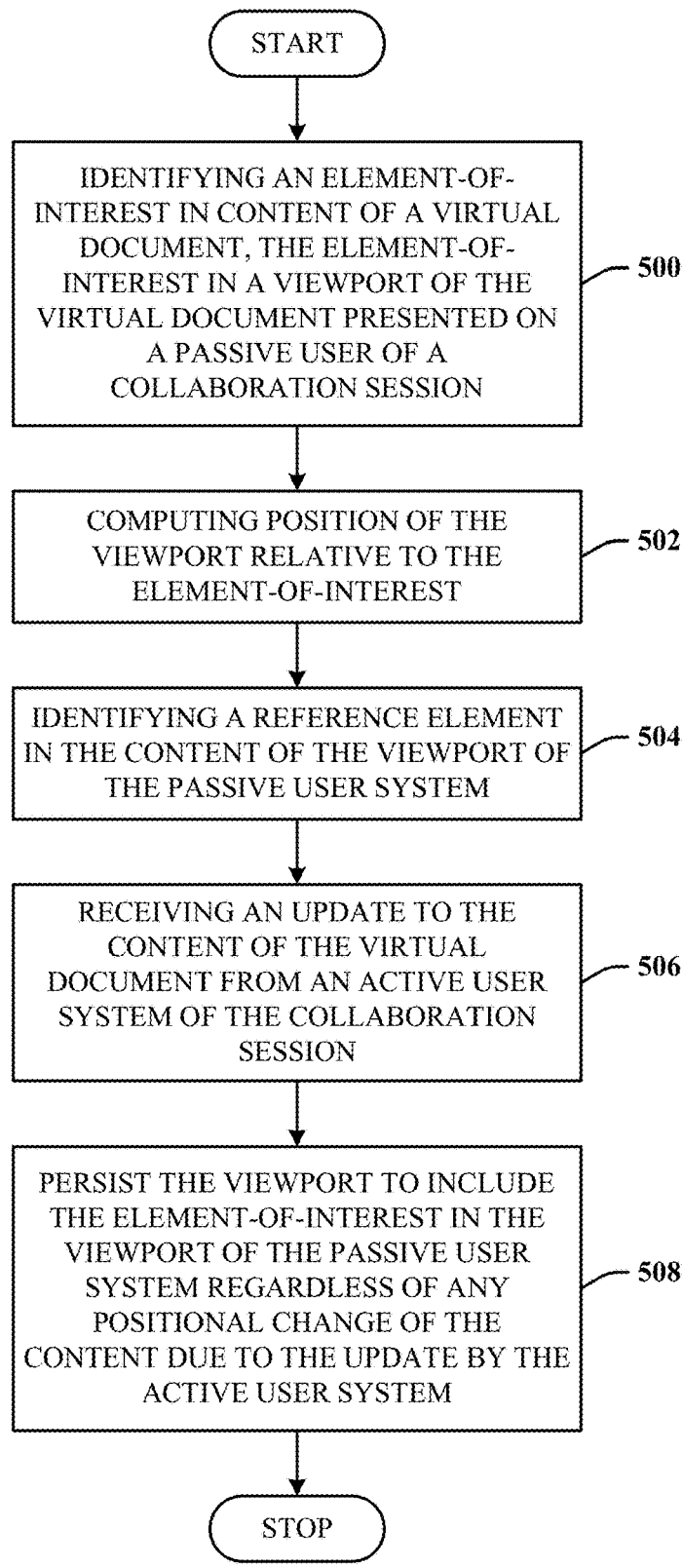
FIG. 5 illustrates an alternative method in accordance with the disclosed architecture.

FIG. 5 illustrates an alternative method in accordance with the disclosed architecture. At 500, an element-of-interest in content of a virtual document is identified. The element-of-interest is in a viewport of the virtual document presented on a passive user system of a collaboration session. At 502, position of the viewport relative to the element-of-interest, is computed. At 504, a reference element is identified in the content of the viewport of the passive user system. At 506, an update to the content of the virtual document is received from an active user system of the collaboration session. At 508, the viewport is persisted to include the element-of-interest in the viewport of the passive user system regardless of any positional change of the content due to the update by the active user system.

The method can further comprise identifying a topmost element in the viewport of the passive user system as the reference element. The method can further comprise adjusting the viewport according to an offset to persist the element-of-interest in the viewport. The method can further comprise synchronizing the update across applications of passive user systems as part of the collaboration session while maintaining position of the element-of-interest in corresponding collaboration viewports of the passive user systems.

Figure 6:
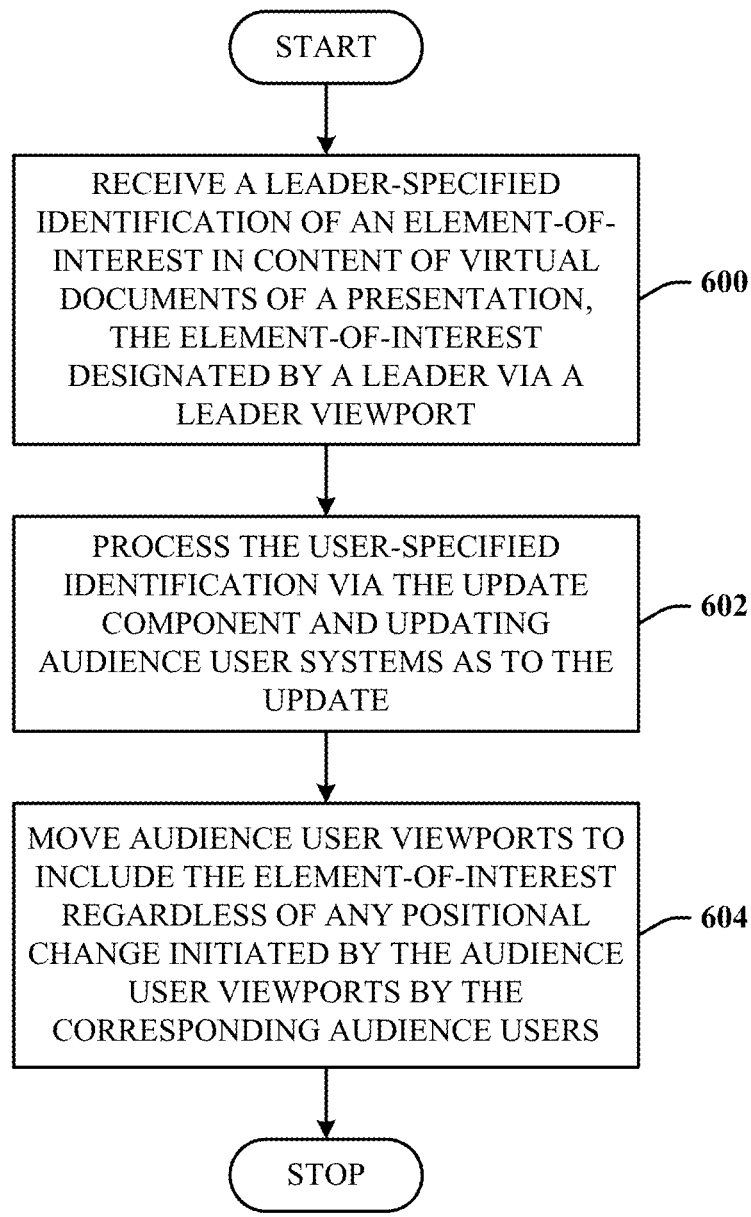
FIG. 6 illustrates yet another alternative method in accordance with the disclosed architecture.

FIG. 6 illustrates yet another alternative method in accordance with the disclosed architecture. At 600, a leader-specified identification of an element-of-interest in content of virtual documents of a presentation, is received. The element-of-interest is designated by a leader via a leader viewport. At 602, the leader-specified identification is processed via the update component and audience user systems are updated as to the update. At 604, audience user viewports are moved to include the element-of-interest regardless of any positional change initiated by the audience user viewports by the corresponding audience users.

As used in this application, the terms "component" is intended to refer to a computer-related entity, either hardware, a combination of software and tangible hardware, software, or software in execution. For example, a component can be, but is not limited to, tangible components such as one or more microprocessors, chip memory, mass storage devices (e.g., optical drives, solid state drives, magnetic storage media drives, etc.), computers, and portable computing and computing-capable devices (e.g., cell phones, tablets, smart phones, etc.). Software components include processes running on a microprocessor, an object (a software entity that maintains state in variables and behavior using methods), an executable, a data structure (stored in a volatile or a non-volatile storage medium), a module (a part of a program), a thread of execution (the smallest sequence of instructions that can be managed independently), and/or a program.

By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 7:
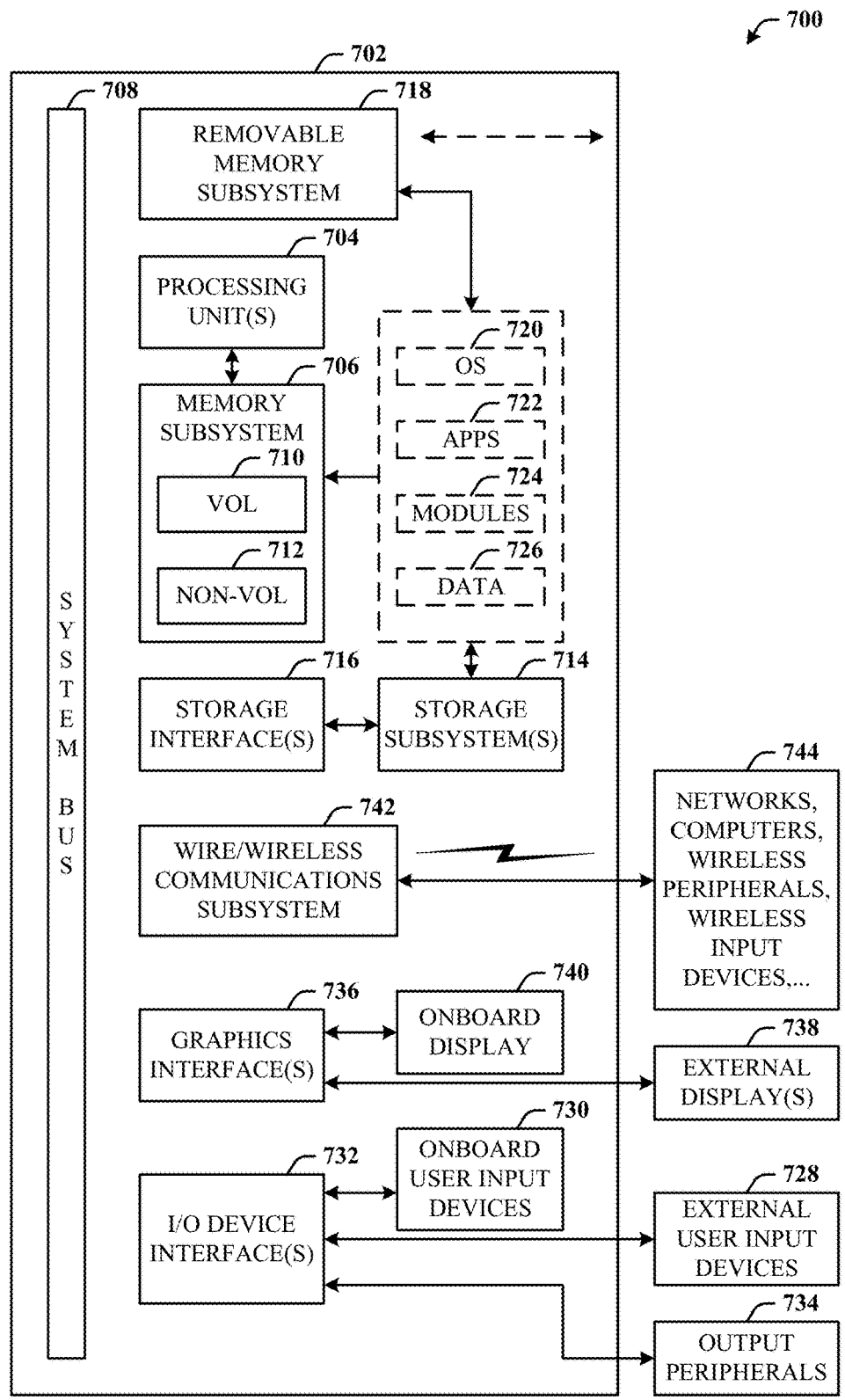
FIG. 7 illustrates a block diagram of a computing system that executes persistent viewports in accordance with the disclosed architecture.

Referring now to FIG. 7, there is illustrated a block diagram of a computing system 700 that executes persistent viewports in accordance with the disclosed architecture. Alternatively, or in addition, the functionally described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc., where analog, digital, and/or mixed signals and other functionality can be implemented in a substrate.

In order to provide additional context for various aspects thereof, FIG. 7 and the following description are intended to provide a brief, general description of the suitable computing system 700 in which the various aspects can be implemented. While the description above is in the general context of computer-executable instructions that can run on one or more computers, those skilled in the art will recognize that a novel implementation also can be realized in combination with other program modules and/or as a combination of hardware and software.

The computing system 700 for implementing various aspects includes the computer 702 having microprocessing unit(s) 704 (also referred to as microprocessor(s) and processor(s)), a computer-readable storage medium (where the medium is any physical device or material on which data can be electronically and/or optically stored and retrieved) such as a system memory 706 (computer readable storage medium/media also include magnetic disks, optical disks, solid state drives, external memory systems, and flash memory drives), and a system bus 708. The microprocessing unit(s) 704 can be any of various commercially available microprocessors such as single-processor, multi-processor, single-core units and multi-core units of processing and/or storage circuits. Moreover, those skilled in the art will appreciate that the novel system and methods can be practiced with other computer system configurations, including minicomputers, mainframe computers, as well as personal computers (e.g., desktop, laptop, tablet PC, etc.), hand-held computing devices, microprocessor-based or programmable consumer electronics, and the like, each of which can be operatively coupled to one or more associated devices.

The computer 702 can be one of several computers employed in a datacenter and/or computing resources (hardware and/or software) in support of cloud computing services for portable and/or mobile computing systems such as wireless communications devices, cellular telephones, and other mobile-capable devices. Cloud computing services, include, but are not limited to, infrastructure as a service, platform as a service, software as a service, storage as a service, desktop as a service, data as a service, security as a service, and APIs (application program interfaces) as a service, for example.

The system memory 706 can include computer-readable storage (physical storage) medium such as a volatile (VOL) memory 710 (e.g., random access memory (RAM)) and a non-volatile memory (NON-VOL) 712 (e.g., ROM, EPROM, EEPROM, etc.). A basic input/output system (BIOS) can be stored in the non-volatile memory 712, and includes the basic routines that facilitate the communication of data and signals between components within the computer 702, such as during startup. The volatile memory 710 can also include a high-speed RAM such as static RAM for caching data.

The system bus 708 provides an interface for system components including, but not limited to, the system memory 706 to the microprocessing unit(s) 704. The system bus 708 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 702 further includes machine readable storage subsystem(s) 714 and storage interface(s) 716 for interfacing the storage subsystem(s) 714 to the system bus 708 and other desired computer components and circuits. The storage subsystem(s) 714 (physical storage media) can include one or more of a hard disk drive (HDD), a magnetic floppy disk drive (FDD), solid state drive (SSD), flash drives, and/or optical disk storage drive (e.g., a CD-ROM drive DVD drive), for example. The storage interface(s) 716 can include interface technologies such as EIDE, ATA, SATA, and IEEE 1394, for example.

One or more programs and data can be stored in the memory subsystem 706, a machine readable and removable memory subsystem 718 (e.g., flash drive form factor technology), and/or the storage subsystem(s) 714 (e.g., optical, magnetic, solid state), including an operating system 720, one or more application programs 722, other program modules 724, and program data 726.

The operating system 720, one or more application programs 722, other program modules 724, and/or program data 726 can include items and components of the system 100 of FIG. 1, items and components of the diagram 200 of FIG. 2, items and components of the system 300 of FIG. 3, and the methods represented by the flowcharts of FIGS. 4-6, for example.

Generally, programs include routines, methods, data structures, other software components, etc., that perform particular tasks, functions, or implement particular abstract data types. All or portions of the operating system 720, applications 722, modules 724, and/or data 726 can also be cached in memory such as the volatile memory 710 and/or non-volatile memory, for example. It is to be appreciated that the disclosed architecture can be implemented with various commercially available operating systems or combinations of operating systems (e.g., as virtual machines).

The storage subsystem(s) 714 and memory subsystems (706 and 718) serve as computer readable media for volatile and non-volatile storage of data, data structures, computer-executable instructions, and so on. Such instructions, when executed by a computer or other machine, can cause the computer or other machine to perform one or more acts of a method. Computer-executable instructions comprise, for example, instructions and data which cause a general purpose computer, special purpose computer, or special purpose microprocessor device(s) to perform a certain function or group of functions. The computer executable instructions may be, for example, binaries, intermediate format instructions such as assembly language, or even source code. The instructions to perform the acts can be stored on one medium, or could be stored across multiple media, so that the instructions appear collectively on the one or more computer-readable storage medium/media, regardless of whether all of the instructions are on the same media.

Computer readable storage media (medium) exclude (excludes) propagated signals per se, can be accessed by the computer 702, and include volatile and non-volatile internal and/or external media that is removable and/or non-removable. For the computer 702, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

A user can interact with the computer 702, programs, and data using external user input devices 728 such as a keyboard and a mouse, as well as by voice commands facilitated by speech recognition. Other external user input devices 728 can include a microphone, an IR (infrared) remote control, a joystick, a game pad, camera recognition systems, a stylus pen, touch screen, gesture systems (e.g., eye movement, body poses such as relate to hand(s), finger(s), arm(s), head, etc.), and the like. The user can interact with the computer 702, programs, and data using onboard user input devices 730 such a touchpad, microphone, keyboard, etc., where the computer 702 is a portable computer, for example.

These and other input devices are connected to the microprocessing unit(s) 704 through input/output (I/O) device interface(s) 732 via the system bus 708, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 732 also facilitate the use of output peripherals 734 such as printers, audio devices, camera devices, and so on, such as a sound card and/or onboard audio processing capability.

One or more graphics interface(s) 736 (also commonly referred to as a graphics processing unit (GPU)) provide graphics and video signals between the computer 702 and external display(s) 738 (e.g., LCD, plasma) and/or onboard displays 740 (e.g., for portable computer). The graphics interface(s) 736 can also be manufactured as part of the computer system board.

The computer 702 can operate in a networked environment (e.g., IP-based) using logical connections via a wired/wireless communications subsystem 742 to one or more networks and/or other computers. The other computers can include workstations, servers, routers, personal computers, microprocessor-based entertainment appliances, peer devices or other common network nodes, and typically include many or all of the elements described relative to the computer 702. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 702 connects to the network via a wired/wireless communication subsystem 742 (e.g., a network interface adapter, onboard transceiver subsystem, etc.) to communicate with wired/wireless networks, wired/wireless printers, wired/wireless input devices 744, and so on. The computer 702 can include a modem or other means for establishing communications over the network. In a networked environment, programs and data relative to the computer 702 can be stored in the remote memory/storage device, as is associated with a distributed system. It will be appreciated that the network connections shown are exemplary and other means of establishing a communications link between the computers can be used.

The computer 702 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi™ (used to certify the interoperability of wireless computer networking devices) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related technology and functions).

The persistent viewports architecture can be implemented as a system, comprising: means for identifying an element-of-interest in content of a virtual document, the element-of-interest in a viewport of the virtual document presented on a passive user system of a collaboration session; means for receiving an update to the content of the virtual document from an active user system of the collaboration session; and means for persisting the element-of-interest in the viewport of the passive user system regardless of any positional change of the content due to the update by the active user system.

The persistent viewports architecture can be implemented as a system, comprising: means for identifying an element-of-interest in content of a virtual document, the element-of-interest in a viewport of the virtual document presented on a passive user system of a collaboration session; means for computing position of the viewport relative to the element-of-interest; means for identifying a reference element in the content of the viewport of the passive user system; means for receiving an update to the content of the virtual document from an active user system of the collaboration session; and means for persisting the viewport to include the element-of-interest in the viewport of the passive user system regardless of any positional change of the content due to the update by the active user system.

In yet another implementation, the persistent viewports architecture can be implemented as a system, comprising: means for receiving a leader-specified identification of an element-of-interest in content of virtual documents of a presentation, the element-of-interest designated by a leader via a leader viewport; means for processing the user-specified identification via the update component and updating audience user systems as to the update; and, means for moving audience user viewports to include the element-of-interest regardless of any positional change initiated by the audience user viewports by the corresponding audience users.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising acts of:
identifying an element-of-interest in content of a virtual document, the element-of-interest in a viewport of the virtual document presented on a passive user system;
receiving an update to the content of the virtual document from an active user system;
determining that the update will change the position of the element-of-interest in the viewport on the passive user system and cause the position of the viewport to be adjusted in order for the element-of-interest to be persisted within the viewport;
causing, based on determining that the update will change the position of the element-of-interest in the viewport on the passive user system and cause the position of the viewport to be adjusted in order for the element-of-interest to be persisted within the viewport, an update notification to be displayed by the passive user system, the update notification providing an option to delay incorporation of the update into the virtual document presented on the passive user system;
receiving a selection in response to the update notification; and
causing, in response to receiving the selection, the passive user system to delay input of the update and queue the update for entry into the virtual document presented on the passive user system.

2. The method of claim 1, further comprising computing position of the viewport relative to the element-of-interest.

3. The method of claim 1, further comprising identifying a reference element in the content of the viewport of the passive user system in response to the update.

4. The method of claim 3, further comprising identifying a topmost element in the viewport of the passive user system as the reference element.

5. The method of claim 1, further comprising identifying a reference element in response to the update and adjusting an offset in the content to persist the element-of-interest in the viewport.

6. The method of claim 1, further comprising searching for the element-of-interest in a memory that stores a hashset and elements of the content.

7. The method of claim 1, further comprising synchronizing the update across applications of passive user systems while maintaining position of the element-of-interest in corresponding viewports of the passive user systems.

8. The method of claim 1, further comprising shifting position of the viewport to include the element-of-interest in the viewport.

9. The method of claim 1, further comprising receiving the update in a part of the virtual document that is outside the viewport of the passive user system.

10. A method, comprising acts of:
identifying an element-of-interest in content of a virtual document, the element-of-interest in a viewport of the virtual document presented on a passive user system of a collaboration session;
computing position of the viewport relative to the element-of-interest;
identifying a reference element in the content of the viewport of the passive user system;
receiving an update to the content of the virtual document from an active user system of the collaboration session;

determining that the update will change the position of the element-of-interest in the viewport on the passive user system and cause the position of the viewport to be adjusted in order for the element-of-interest to be persisted within the viewport;

causing, based on determining that the update will change the position of the element-of-interest in the viewport on the passive user system and cause the position of the viewport to be adjusted in order for the element-of-interest to be persisted within the viewport, an update notification to be displayed by the passive user system, the update notification providing an option to delay incorporation of the update into the virtual document presented on the passive user system;

receiving a selection in response to the update notification; and causing, in response to receiving the selection, the passive user system to delay input of the update and queue the update for entry into the virtual document presented on the passive user system.

11. The method of claim 10, further comprising identifying a topmost element in the viewport of the passive user system as the reference element.

12. The method of claim 10, further comprising adjusting the viewport according to an offset to persist the element-of-interest in the viewport.

13. The method of claim 10, further comprising synchronizing the update across applications of passive user systems as part of the collaboration session while maintaining position of the element-of-interest in corresponding collaboration viewports of the passive user systems.

14. A system, comprising:
at least one processor;
memory, operatively connected to the at least one processor and containing instructions that, when executed by the at least one processor, cause the system to perform a method, the method comprising:
identifying an element-of-interest in content of a virtual document, the element-of-interest in a viewport of the virtual document presented on a passive user system;
receiving an update to the content of the virtual document from an active user system;
determining that the update will change the position of the element-of-interest in the viewport on the passive user system and cause the position of the viewport to be adjusted in order for the element-of-interest to be persisted within the viewport;

causing, based on determining that the update will change the position of the element-of-interest in the viewport on the passive user system and cause the position of the viewport to be adjusted in order for the element-of-interest to be persisted within the viewport, an update notification to be displayed by the passive user system, the update notification providing an option to delay incorporation of the update into the virtual document presented on the passive user system;

receiving a selection in response to the update notification; and causing, in response to receiving the selection, the viewport of the passive user system to the passive user system to delay input of the update and queue the update for entry into the virtual document presented on the passive user system.

15. The system of claim 14, wherein the method further comprises computing position of the viewport relative to the element-of-interest.

16. The system of claim 14, wherein the method further comprises identifying a reference element in the content of the viewport of the passive user system in response to the update.

17. The system of claim 16, wherein the method further comprises identifying a topmost element in the viewport of the passive user system as the reference element.

18. The system of claim 16, wherein the method further comprises identifying the reference element in response to the update and adjusting an offset in the content to persist the element-of-interest in the viewport.

19. The system of claim 14, wherein the method further comprises searching for the element-of-interest in a memory that stores a hashset and elements of the content.

20. The system of claim 14, wherein the method further comprises synchronizing the update across applications of passive user systems while maintaining position of the element-of-interest in corresponding viewports of the passive user systems.

* * * * *